(12) United States Patent
Lee et al.

(10) Patent No.: US 9,917,458 B2
(45) Date of Patent: Mar. 13, 2018

(54) BATTERY CHARGING METHOD AND BATTERY PACK USING THE SAME

(71) Applicant: SAMSUNG SDI CO., LTD., Yongin-si, Gyeonggi-do (KR)

(72) Inventors: Myoung-Seok Lee, Yongin-si (KR); Su-Bin Song, Yongin-si (KR); Joo-Sick Jung, Yongin-si (KR); Dmitry Golovanov, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 114 days.

(21) Appl. No.: 14/829,780

(22) Filed: Aug. 19, 2015

(65) Prior Publication Data

US 2016/0064967 A1 Mar. 3, 2016

(30) Foreign Application Priority Data

Aug. 26, 2014 (KR) ........................ 10-2014-0111568

(51) Int. Cl.
*H02J 7/00* (2006.01)

(52) U.S. Cl.
CPC .......... *H02J 7/0052* (2013.01); *H02J 7/0077* (2013.01); *H02J 7/0093* (2013.01)

(58) Field of Classification Search
USPC ................. 320/134, 150, 160, 139, 145, 162
See application file for complete search history.

(56) References Cited

U.S. PATENT DOCUMENTS

| | | | | |
|---|---|---|---|---|
| 6,107,782 A | * | 8/2000 | Imai | H01M 10/44 320/150 |
| 2006/0176025 A1 | * | 8/2006 | Mori | H02J 7/0073 320/134 |
| 2007/0188134 A1 | * | 8/2007 | Hussain | H01M 10/44 320/114 |
| 2009/0085527 A1 | * | 4/2009 | Odaohhara | H02J 7/0091 320/150 |
| 2009/0322287 A1 | * | 12/2009 | Ozeki | H02J 7/0018 320/145 |
| 2010/0327810 A1 | * | 12/2010 | Jimbo | B60W 10/26 320/126 |
| 2011/0012563 A1 | * | 1/2011 | Paryani | H01M 10/0525 320/162 |

(Continued)

FOREIGN PATENT DOCUMENTS

| | | |
|---|---|---|
| JP | 2011-024412 A | 2/2011 |
| KR | 10-2012-0078842 A | 7/2012 |
| KR | 10-2013-0080518 A | 7/2013 |

*Primary Examiner* — Brian Ngo
(74) *Attorney, Agent, or Firm* — Lee & Morse, P.C.

(57) ABSTRACT

A method of charging a battery includes performing a first charging operation in a first period, performing a second charging operation in a second period, and performing a third charging operation in a third period. Each of the first, second, and third periods includes a constant current supplying period and a constant voltage supplying period. Different currents are supplied in the constant current supplying periods of at least two of the first, second, and third periods. Different voltages are supplied in the constant voltage supplying periods of at least two of the first, second, and third periods. The second period is between the first and third periods, and the second period is longer than the first and third periods.

19 Claims, 6 Drawing Sheets

(56) References Cited

U.S. PATENT DOCUMENTS

| | | | |
|---|---|---|---|
| 2011/0037438 A1 | 2/2011 | Bhardwaj et al. | |
| 2011/0156661 A1* | 6/2011 | Mehta | H02J 7/0073 320/160 |
| 2012/0086406 A1* | 4/2012 | Maeagawa | H02J 7/008 320/162 |
| 2012/0169284 A1 | 7/2012 | Park | |
| 2013/0162196 A1* | 6/2013 | Li | H02J 7/045 320/107 |
| 2014/0097788 A1* | 4/2014 | Kim | H02J 7/007 320/107 |
| 2015/0039151 A1* | 2/2015 | Yumura | B60L 11/1861 700/297 |
| 2015/0077058 A1* | 3/2015 | Jung | H01M 10/44 320/112 |

\* cited by examiner

BATTERY CHARGING METHOD AND BATTERY PACK USING THE SAME

CROSS-REFERENCE TO RELATED APPLICATION

Korean Patent Application No. 10-2014-0111568, filed on Aug. 26, 2014, and entitled, "Battery Charging Method and Battery Pack Using the Same," is incorporated by reference herein in its entirety.

BACKGROUND

1. Field

One or more embodiments described herein relate to a battery charging method and a battery pack using a battery charting method.

2. Description of the Related Art

Mobile phones, digital cameras, laptop computers, and other types of portable and/or electronic systems are powered by batteries. One type of battery includes a protecting circuit for controlling charging and discharging operations.

SUMMARY

In accordance with one embodiment, a method of charging a battery includes performing a first charging operation in a first period, performing a second charging operation in a second period, and performing a third charging operation in a third period, wherein the second period is between the first and third periods and wherein the second period is longer than the first and third periods.

Each of the first, second, and third periods may include a constant current supplying period and a constant voltage supplying period. Different currents may be supplied in the constant current supplying periods of at least two of the first, second, and third periods. Current supplied in the second period may be less than current supplied in the first period, and current supplied in the third period may be less than current supplied in the second period.

Different voltages may be supplied in the constant voltage supplying periods of at least two of the first, second, and third periods. The voltage supplied in the constant voltage supplying period of the second period may be less than the voltage supplied in the constant voltage supplying period of the first period, and the voltage supplied in the constant voltage supplying period of the third period may be less than the voltage supplied in the constant voltage supplying period of the second period. The battery may be completely charged at an end of the third period.

The constant current supplying period in the second period may be larger than the constant current supplying period in the first period and the constant current supplying period in the third period. The constant voltage supplying period in the first period may be larger than the constant voltage supplying period in the second period and the constant voltage supplying period in the third period.

The constant current supplying period of the first period may be larger than the constant current supplying period of the third period, and the constant voltage supplying period of the first period may be larger than the constant voltage supplying period of the third period.

The constant current supplying period of the second period may be larger than the constant current supplying period of the third period, and wherein the constant voltage supplying period of the second period may be larger than the constant voltage supplying period of the third period. The first, second, and third periods may be determined based on a charging state of the battery.

In accordance with another embodiment, a battery pack includes a chargeable battery and a battery manager to control a charging operation of the chargeable battery in first, second, and third periods, wherein each of the first, second, and third periods includes a constant current supplying period and a constant voltage supplying period, and wherein the constant current supplying period in the first period and the constant current supplying period of the third period are smaller than the constant current supplying period in the second period.

The battery pack may include at least one of a current detector to measure a charging current of the battery or a voltage detector to measure a charging voltage of the battery. At least one of a charging current or a charging voltage of the battery may be different in at least two of the first, second, or third periods. The battery may be completely charged at an end of the third period.

In accordance with another embodiment, a battery pack includes a rechargeable battery, and a battery manger to control charging of the rechargeable battery in at least first, second, and third periods, wherein each of the first, second, and third periods includes a constant current supplying period and a constant voltage supplying period, and wherein the battery manager is to control supply of different currents in the constant current supplying periods of at least two of the first, second, and third periods, and is to control supply of different voltages in the constant voltage supplying periods of at least two of the first, second, and third periods.

The current supplied in the second period may be less than the current supplied in the first period, and the current supplied in the third period may be less than the current supplied in the second period. The second period may be between the first and third periods, and the second period may be longer than the first and third periods.

The voltage supplied in the constant voltage supplying period of the second period may be less than the voltage supplied in the constant voltage supplying period of the first period, and the voltage supplied in the constant voltage supplying period of the third period may be less than the voltage supplied in the constant voltage supplying period of the second period.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

Figure 1:
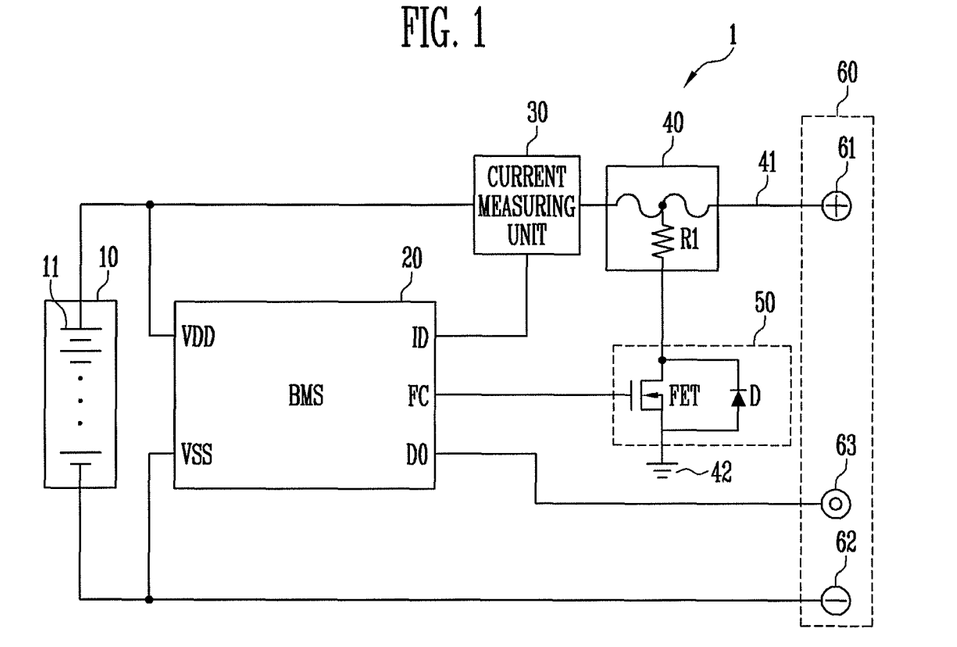
FIG. 1 illustrates an embodiment of a battery pack.

FIG. 1 illustrates an embodiment of a battery pack 1 which includes a battery 10, a battery management system (BMS) 20, a current measuring unit 30, a fuse 40, a fuse controlling switch 50, and a terminal unit 60.

The battery 10 supplies stored power to an electronic device coupled to the battery pack 1. When a charger is coupled to the battery pack 1, the battery 10 may be charged, for example, by external current. The battery 10 includes at least one cell 11. The battery cell 11 may be a chargeable secondary battery. e.g., a nickel-cadmium battery, a lead storage battery, a nickel metal hydride (NiMH) battery, a lithium ion battery, or a lithium polymer battery.

The BMS 20 controls charging and discharging of the battery 10, and controls balancing of the battery cell(s) 11 in the battery 10. In addition, the BMS 20 determines a state of charge (SOC) of the battery 10 corresponding to a value (e.g., a current value) supplied from the current measuring unit 30.

The BMS 20 may include a power source terminal VDD to which a power source voltage is applied, a ground terminal VSS to which a ground voltage is applied, a fuse controlling terminal FC, a data output terminal DO, and a current measuring terminal ID.

The BMS 20 generates a fuse blocking signal applied to the fuse controlling switch 50 to break the fuse 40. The fuse blocking signal is output through the fuse controlling terminal FC. In addition, the BMS 20 may transmit data corresponding to a charging amount and/or other data items to an external apparatus, for example, the electronic device to which the battery pack 1 is coupled or the charger via the data output terminal DO.

The BMS 20 receives a charging current value measured by the current measuring unit 30 via the current measuring terminal ID. The BMS 20 that receives the charging current value may control a constant voltage or a constant current supplied to the battery 10 to correspond to a charging state of the battery 10. In FIG. 1, the BMS 20 is illustrated as controlling elements of the battery pack 1. In another embodiment, an analog front end for controlling these elements, while monitoring a state of the battery 10, may be further provided, and the BMS 20 may control the analog front end.

The current measuring unit 30 is on a current path and measures a value of a charging current input to the battery 10. The current value measured by the current measuring unit 30 is supplied to the BMS 20. In FIG. 1, the current measuring unit 30 is illustrated as being formed between the battery 10 and the fuse 40. In another embodiment, the current measuring unit 30 may be anywhere in which the value of the charging current input to the battery 10 may be measured. For example, the current measuring unit 30 may be in the BMS 20 to measure the charging current value.

The fuse 40 is on a current path 41 on which current (e.g., large current) flows between the battery 10 and the terminal unit 60. When there is something wrong with the battery pack 1, the fuse 40 breaks to prevent discharging current and/or charging current from flowing. A resistor R1 in, or coupled to, the fuse 40 is between the current path 41 and a reference potential 42, e.g., ground. When current of no less than a uniform or predetermined magnitude flows through the resistor R1, heat is generated in the resistor R to break the fuse 40.

The fuse controlling switch 50 controls current flow through the resistor R1 to break the fuse 40. The fuse controlling switch 50 is between the fuse 40 and the reference potential, and is controlled by the fuse blocking signal from the BMS 20. When the fuse blocking signal is received, the fuse controlling switch 50 turns on to allow current to flow through the resistor R1. The fuse controlling switch 50 may include, for example, a field effect transistor (FET) and a parasitic diode (D).

The terminal unit 60 couples the battery pack 1 to the external apparatus. The external apparatus may be, for example, an electronic device or a charger. The terminal unit 60 includes a positive electrode terminal 61 and a negative electrode terminal 62. The charging current is input to and the discharging current is output from the positive electrode terminal 61. The charging current is output from and the discharging current is input to the negative electrode terminal 62. The terminal unit 60 also includes an output terminal 63 coupled to the data output terminal DO of the BMS 20. The BMS 20 outputs data on the charging amount of the battery, and/or other information, and/or a control signal to the external apparatus through the output terminal 63.

Additional elements may be included in or coupled to the battery pack 1 in FIG. 1. Examples include but are not limited to a charging control switch for controlling the charging current and a discharging control switch for controlling the discharging current.

Figure 2:
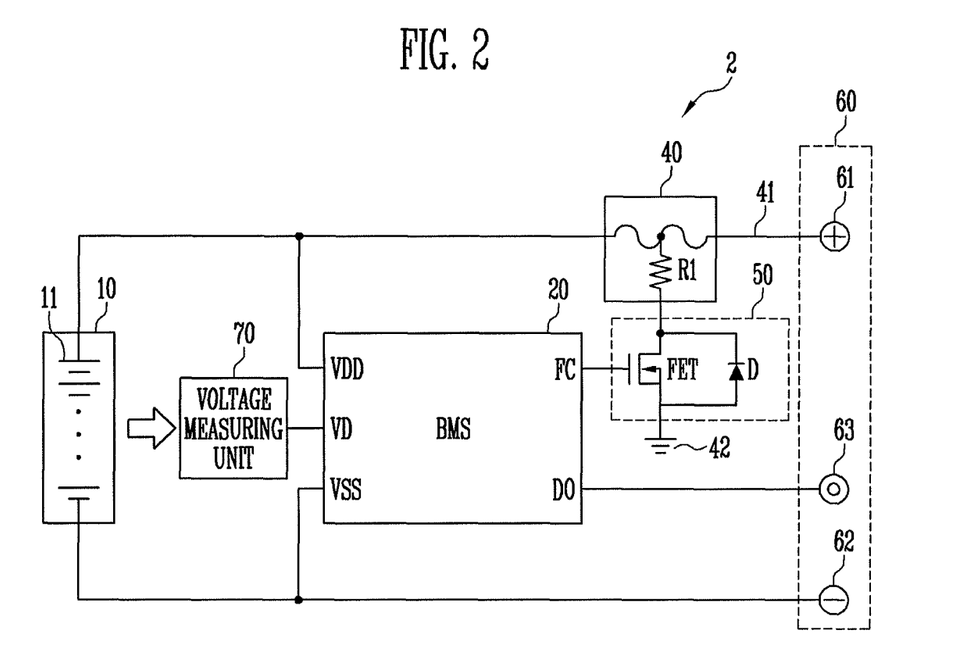
FIG. 2 illustrates another embodiment of a battery pack.

FIG. 2 illustrates another embodiment of a battery pack 2. In FIG. 2, the same elements as those of FIG. 1 are denoted by the same reference numerals. Referring to FIG. 2, the battery pack 2 includes the battery 10, the BMS 20, the fuse 40, the fuse controlling switch 50, the terminal unit 60, and a voltage measuring unit 70.

The voltage measuring unit 70 measures a voltage value of the battery 10 and supplies the measured voltage value to the BMS 20. The BMS 20 receives the voltage value measured by the voltage measuring unit 70 through a voltage measuring terminal VD, and determines the charging amount of the battery 10 based on the received voltage value. In FIG. 2, the voltage measuring unit 70 is separated from the BMS 20. Alternatively, the voltage measuring unit 70 may be included in the BMS 20.

In another embodiment, the battery pack 2 may include the current measuring unit 30 of FIG. 1 and the voltage measuring unit 70. The current measuring unit 30 and the voltage measuring unit 70 may be coupled to the BMS 20, or one or more of the current measuring unit 30 and the voltage measuring unit 70 may be in the BMS 20. In this embodiment, the BMS 20 determines the charging amount of the battery 10 based on the charging current value from the current measuring unit 30 and the charging voltage value from the voltage measuring unit 70.

Figure 3:
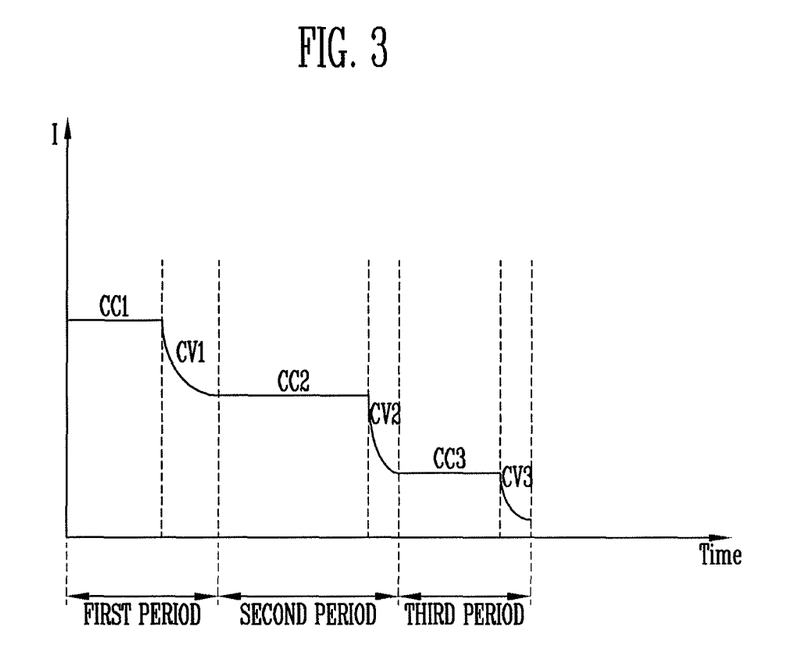
FIG. 3 illustrates an embodiment of a method for charging a battery pack.

FIG. 3 illustrates an embodiment of a method for charging a battery pack, which, for example, may be the battery pack 1 or 2 in FIG. 1 or 2. Referring to FIG. 3, the battery 10 is charged in a plurality of periods.

For example, the battery 10 is charged by different constant currents and constant voltages in a first period, a second period, and a third period. Each of the periods may be previously set as a predetermined period, for example, based on the size of the battery 10, a kind of the used cell 11, and/or variables in which deterioration of the battery 10 may be reduced or minimized.

The BMS 20 charges the battery 10 in the first period, the second period, and the third period to correspond to the charging current and/or the charging voltage of the battery 10, that is, the charging state of the battery 10.

Each of the first period, the second period, and the third period includes a constant current supplying period CC and a constant voltage supplying period CV. For example, the first period includes a first constant current supplying period CC1 and a first constant voltage supplying period CV1. The second period includes a second constant current supplying period CC2 and a second constant voltage supplying period CV2. The third period includes a third constant current supplying period CC3 and a third constant voltage supplying period CV3.

In the constant current supplying period CC, the battery 10 is charged while the constant current is supplied. When the constant current is supplied to the battery 10, the battery 10 is charged within a short time. In one embodiment, the constant currents supplied in the first constant current supplying period CC1, the second constant current supplying period CC2, and the third constant current supplying period CC3 have different values.

For example, as the SOC of the battery 10 increases, a magnitude of the constant current is reduced. That is, the constant current supplied in the first constant current supplying period CC1 is larger than the constant current supplied in the second constant current supplying period CC2. The constant current supplied in the second constant current supplying period CC2 is larger than the constant current supplied in the third constant current supplying period CC3. That is, according to one embodiment, a value of the current supplied in the constant current supplying period CC is reduced from a first period (in FIG. 3, the first period) toward a last period (in FIG. 3, the third period), in order to reduce or prevent deterioration of the battery 10 by an over-current condition.

In the constant voltage supplying period CV, the battery 10 is charged while the constant voltage is supplied. For example, when the battery 10 is charged using only constant current, heat is generated by the current. As a result, the probability of the battery 10 deteriorating increases. To prevent or reduce this deterioration, in one embodiment, each period may includes the constant voltage supplying period CV. When the constant voltage is supplied to the battery 10, heat generated by the battery 10 is reduced or minimized to prevent or reduce deterioration of the battery 10. In another embodiment, one or more of the first, second, or third periods may have a constant voltage supplying period CV.

When all three periods have constant voltage supplying periods, the constant voltages supplied in the first constant voltage supplying period CV1, the second constant voltage supplying period CV2, and the third constant voltage supplying period CV3 may have different values.

For example, as the SOC of the battery 10 increases, a magnitude of the constant voltage is reduced. In one embodiment, the constant voltage supplied in the first constant voltage supplying period CV1 is larger than the constant voltage supplied in the second constant voltage supplying period CV2. The constant voltage supplied in the second constant voltage supplying period CV2 is larger than the constant voltage supplied in the third constant voltage supplying period CV3. Thus, a value of the voltage supplied in the constant voltage supplying period CV is reduced from the first period toward the last period. In another embodiment, the constant voltages supplied in one or more of the first, second, and third periods may have the same value.

Figure 4A:
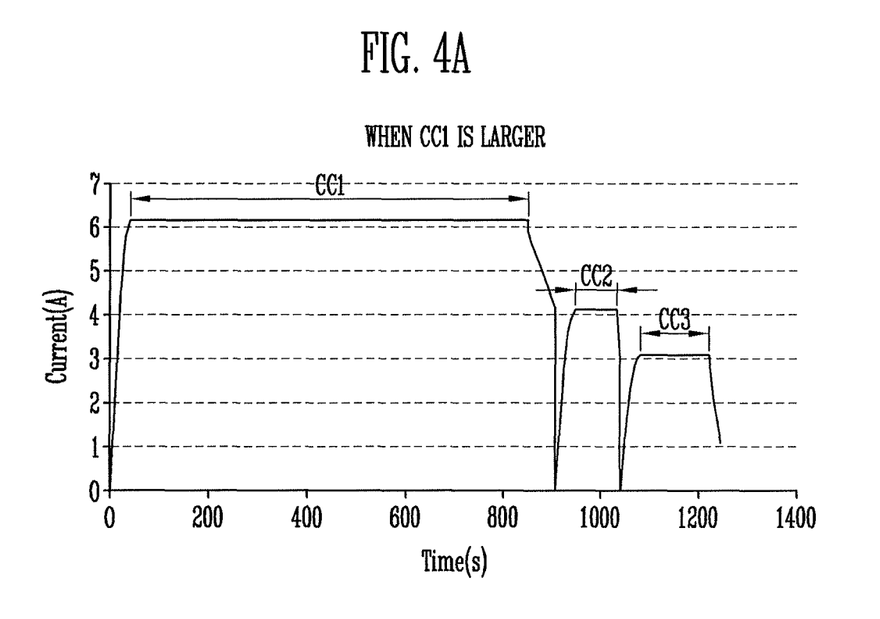
FIGS. 4A to 4C illustrate examples of battery charging states for constant current supplying periods.
Figure 4B:
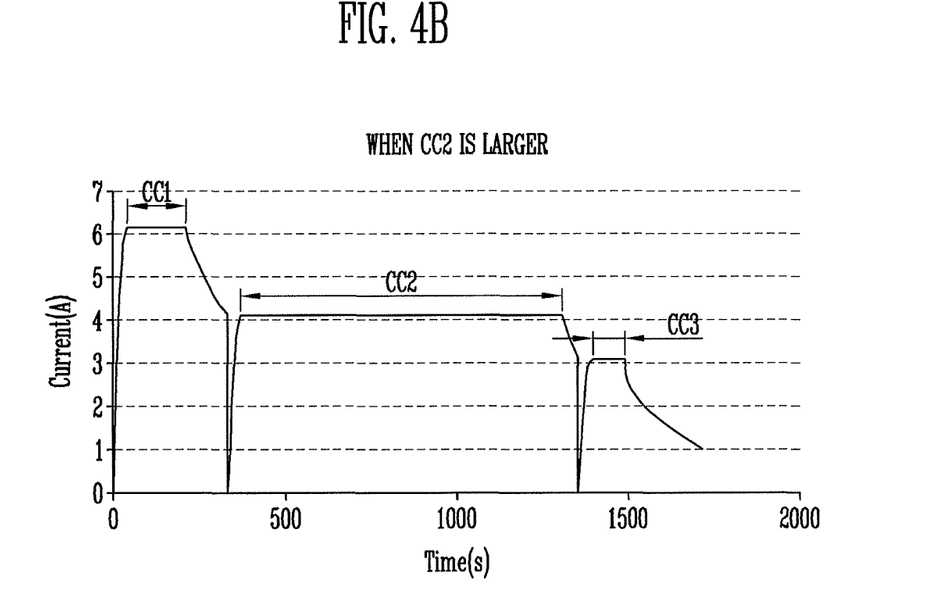
Figure 4C:
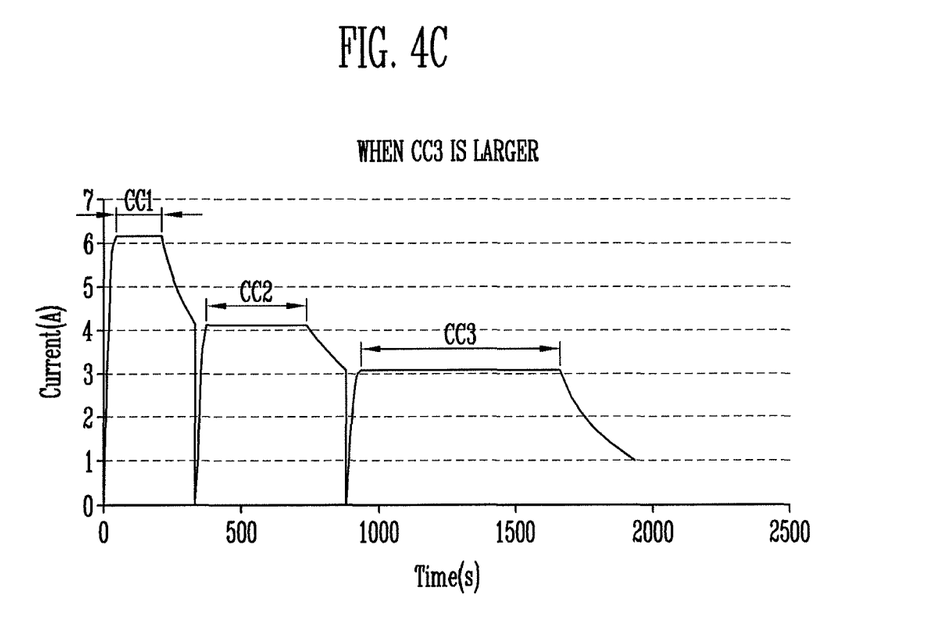

FIGS. 4A to 4C are examples of battery charging states corresponding to times allotted to constant current supplying periods. In FIGS. 4A to 4C, the battery 10 is a 2 Ah cell and a target charging time is set to 1.800 s.

TABLE 1

|  | When CC1 is larger | When CC2 is larger | When CC3 is larger |
| --- | --- | --- | --- |
| Charging time (s) | 1,246.5 | 1,722.4 | 1,937.0 |
| Capacity (Ah) | 1.90 | 1.96 | 1.99 |

In FIG. 4A, the first constant current supplying period CC1 is larger than the second constant current supplying period CC2 and the third constant current supplying period CC3. In this case, as illustrated in TABLE 1, the battery 10 is charged by 1.90 Ah for 1,246.5 seconds. Thus, the battery 10 is charged by the high constant current supplied in the first constant current supplying period CC1 within a relatively short period of time. However, when the first constant current supplying period CC1 is large, the charging capacity of the battery 10 is low. As a result, the battery 10 may rapidly deteriorate because of the high constant current.

In FIG. 4B, the second constant current supplying period CC2 is larger than the first constant current supplying period CC1 and the third constant current supplying period CC3. In this case, as illustrated in the TABLE 1, the battery 10 is charged by 1.96 Ah for 1,722.4 seconds. Thus, the battery 10 may be stably charged within a desired charging time when the second constant current supplying period CC2 is large. In addition, the constant current supplied in the second constant current supplying period CC2 has a smaller value than the constant current supplied in the first constant current supplying period CC1. As a result, it is possible to reduce or minimize deterioration of the battery 10.

In FIG. 4C, the third constant current supplying period CC3 is larger than the first constant current supplying period CC1 and the second constant current supplying period CC2. In this case, as illustrated in TABLE 1, the battery 10 is charged by 1.99 Ah for 1,937.0 seconds. Thus, when the third constant current supplying period CC3 is large, charging capacity of the battery 10 is high, but a large charging time is required.

Therefore, according to one embodiment, the second constant current supplying period CC2 in the second period is larger than the constant current supplying periods CC1 and CC3 in the other periods. In this case, the battery 10 may be stably charged while reducing or minimizing deterioration of the battery 10.

That is, according to one embodiment, the battery 10 is charged using a plurality of periods including constant current supplying periods and constant voltage supplying periods, and the constant current supplying period in the first period (in FIG. 3, the first period) and the constant current supplying period in the last period (in FIG. 3, the third period) are smaller than the constant current supplying period in the other at least one period. In other embodiments, charging of the battery may be performed using two periods or more than three periods.

Figure 5A:
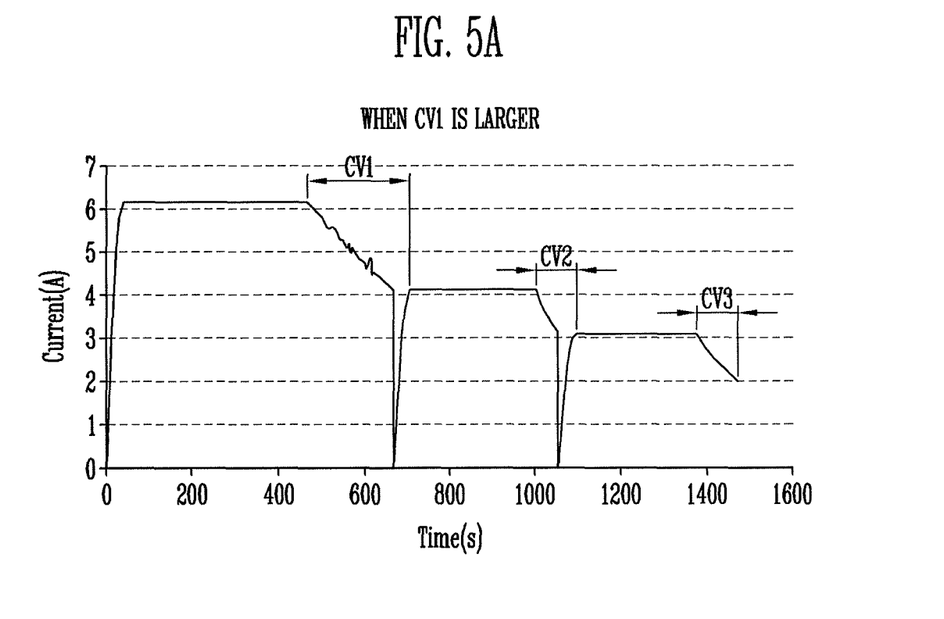
FIGS. 5A to 5C illustrate examples of battery charging states for constant voltage supplying periods.
Figure 5B:
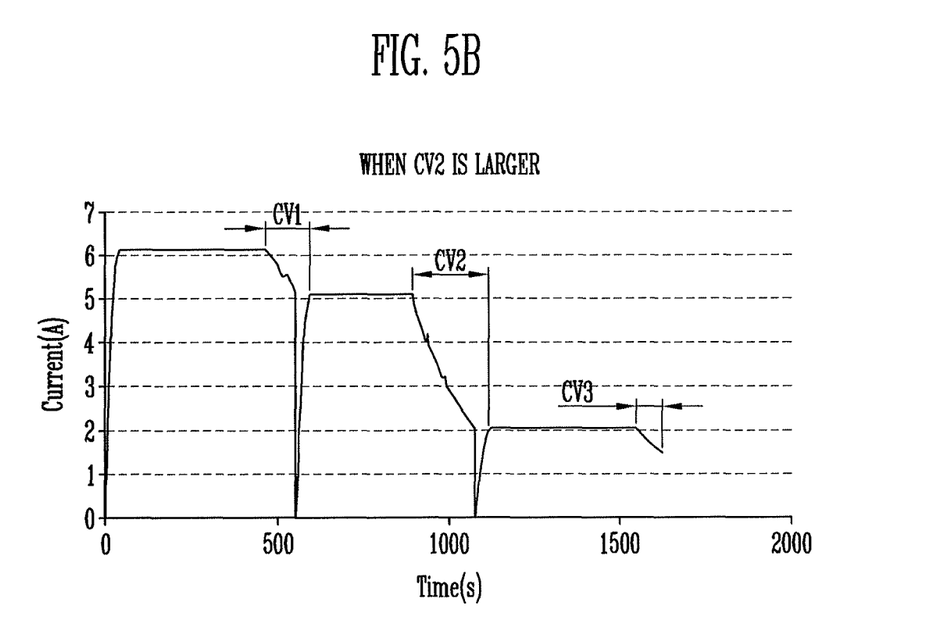
Figure 5C:
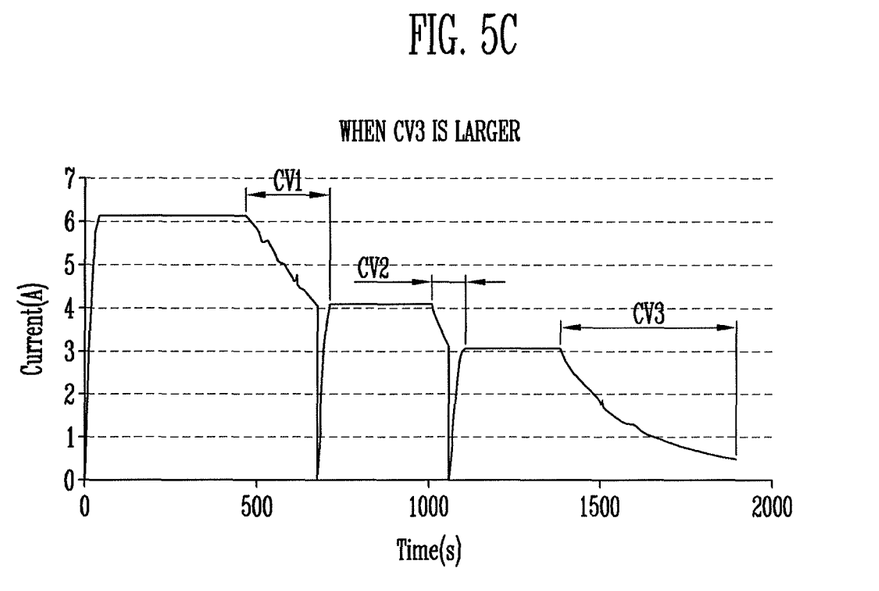

FIGS. 5A to 5C are examples of battery charging states corresponding to times allotted to constant voltage supplying periods. In FIGS. 5A to 5C, the battery 10 is a 2 Ah cell and the target charging time is set as 1,800 s.

TABLE 2

|  | When CV1 is larger | When CV2 is larger | When CV3 is larger |
|---|---|---|---|
| Charging time (s) | 1,473.8 | 1,620.4 | 1,882.6 |
| Capacity (Ah) | 1.91 | 1.94 | 2.00 |

In FIG. 5A, the first constant voltage supplying period CV1 is larger than the second constant voltage supplying period CV2 and the third constant voltage supplying period CV3. In this case, as illustrated in TABLE 2, the battery 10 is charged by 1.91 Ah for 1,473.8 seconds. Thus, when the first constant voltage supplying period CV1 is large, the charging amount of the battery 10 may be increased in a relatively short time.

In FIG. 5B, the second constant voltage supplying period CV2 is larger than the first constant voltage supplying period CV1 and the third constant voltage supplying period CV3. In this case, as illustrated in TABLE 2, the battery 10 is charged by 1.94 Ah for 1,620.4 seconds (s). Thus, when the second constant voltage supplying period CV2 is large, the battery 10 must be charged for a longer time than when the first constant voltage supplying period CV1 is large.

In FIG. 5C, the third constant voltage supplying period CV3 is larger than the first constant voltage supplying period CV1 and the second constant voltage supplying period CV2. In this case, as illustrated in TABLE 2, the battery 10 is charged by 2 Ah for 1,882.6 seconds. Thus, when the third constant voltage supplying period CV3 is large, the charging capacity of the battery 10 is high but a large charging time is required.

Therefore, according to one embodiment, the first constant voltage supplying period CV1 in the first period is larger than the constant voltage supplying periods CV2 and CV3 in the other two periods. As a result, the battery 10 may be stably charged in a short time.

For example, according to one embodiment, the battery 10 is charged in periods including the constant current supplying periods and the constant voltage supplying periods, and the constant voltage supplying period in the first period (in FIG. 3, the first period) is larger than the constant voltage supplying period in the other periods.

Figure 6A:
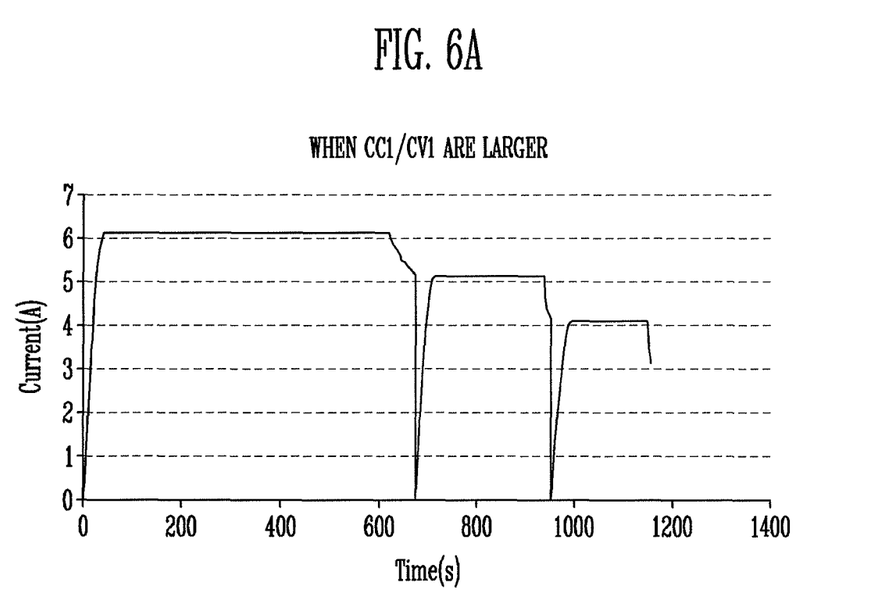
FIGS. 6A to 6C illustrate examples of battery charging states for constant current supplying periods and constant voltage supplying periods.
Figure 6B:
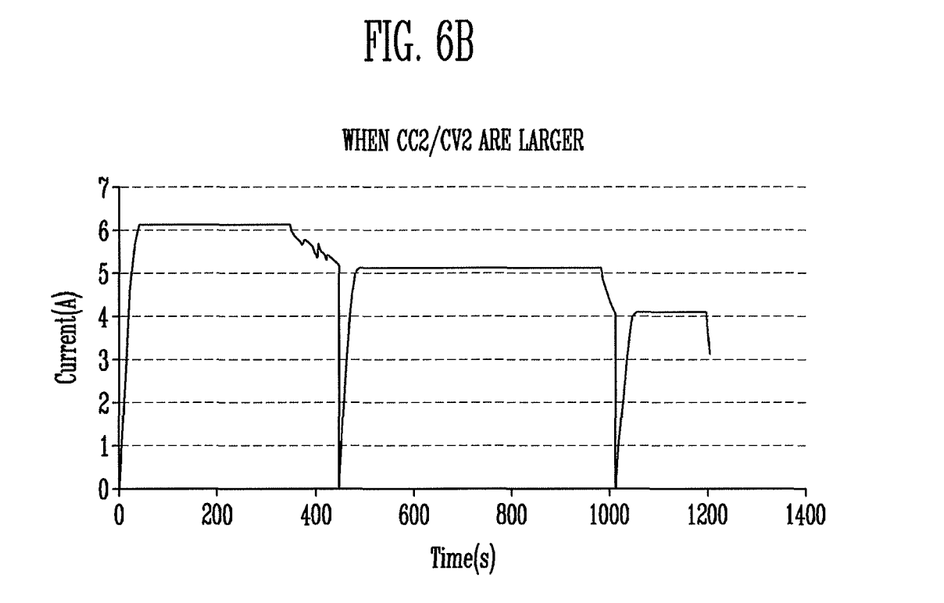
Figure 6C:
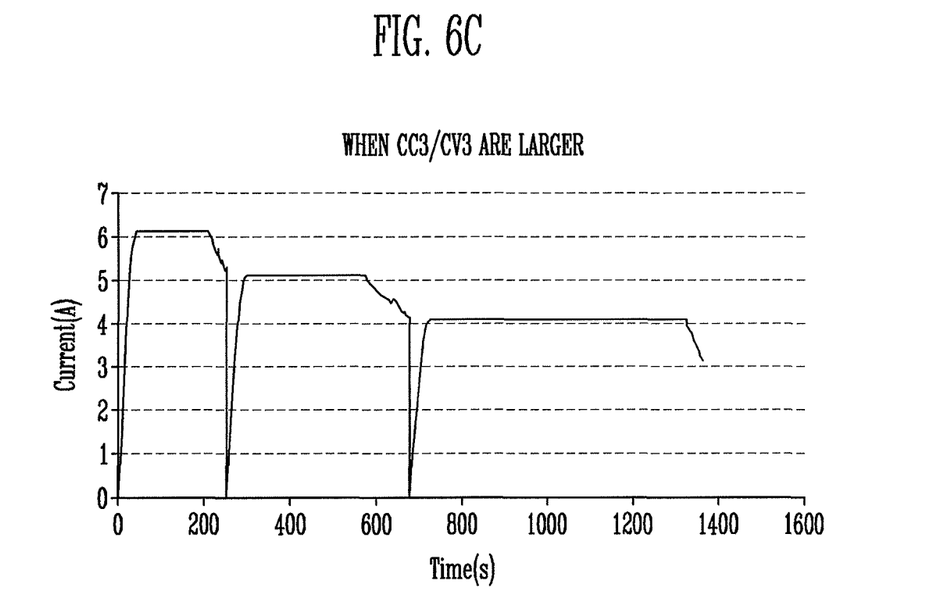

FIGS. 6A to 6C are examples of battery charging states corresponding to the constant current supplying periods and the constant voltage supplying periods. In FIGS. 6A to 6C, the battery 10 is a 2 Ah cell.

TABLE 3

|  | When CC1/ CV1 are larger | When CC2/ CV2 are larger | When CC3/ CV3 are larger |
|---|---|---|---|
| Charging time (s) | 1,157.9 | 1,204.6 | 1,363.8 |
| Capacity (Ah) | 1.81 | 1.81 | 1.84 |

In FIG. 5A the first constant current supplying period CC1/the first constant voltage supplying period CV1 are larger than the second constant current supplying period CC2/the second constant voltage supplying period CV2 and the third constant current supplying period CC3/the third constant voltage supplying period CV3. Because the constant voltage supplying periods CV are smaller than the constant current supplying periods CC, in FIG. 5A, the first period may be largest.

In FIG. 5A, when the first constant current supplying period CC1/the first constant voltage supplying period CV1 are large, as illustrated in TABLE 3, the battery 10 is charged by 1.81 Ah for 1,157.9 seconds. Thus, the battery 10 may be charged for a short time when the first constant current supplying period CC1/the first constant voltage supplying period CV1 are large.

In FIG. 5B, the second constant current supplying period CC2/the second constant voltage supplying period CV2 are larger than the first constant current supplying period CC1/the first constant voltage supplying period CV1 and the third constant current supplying period CC3/the third constant voltage supplying period CV3. In this case, the second period may be largest among the battery charging periods.

Also, as illustrated in FIG. 5B, when the second constant current supplying period CC2/the second constant voltage supplying period CV2 are large, as illustrated in TABLE 3, the battery 10 is charged by 1.81 Ah for 1,204.6 seconds. Thus, the battery 10 may be charged within a short time when the second constant current supplying period CC2/the second constant voltage supplying period CV2 are large.

In FIG. 5C, the third constant current supplying period CC3/the third constant voltage supplying period CV3 are larger than the first constant current supplying period CC1/the first constant voltage supplying period CV1 and the second constant current supplying period CC2/the second constant voltage supplying period CV2. In this case, the third period may be largest among the battery charging periods.

Also, as illustrated in FIG. 5C, when the third constant current supplying period CC3/the third constant voltage supplying period CV3 are large, as illustrated in TABLE 3, the battery 10 is charged by 1.84 Ah for 1,363.8 seconds. Thus, when the third constant current supplying period CC3/the third constant voltage supplying period CV3 are large, the capacity of the battery may be secured but charging time increases.

In the foregoing examples, the battery 10 may be charged within a short time when the first constant current supplying period CC1/the first constant voltage supplying period CV1 or the second constant current supplying period CC2/the second constant voltage supplying period CV2 are large. When the first constant current supplying period CC1, in which a high constant current is supplied, is large, the battery 10 may deteriorate. Therefore, according to at least one embodiment, the second constant current supplying period CC2/the second constant voltage supplying period CV2 are largest. As a result, deterioration of the battery 10 may be reduced or prevented along with charging time.

Also, according to at least one embodiment, the battery 10 is charged using a plurality of periods, including one or more constant current supplying periods and one or more constant voltage supplying periods. Also, at least one period excluding the first period (in FIG. 3, the first period) and the last period (in FIG. 3, the third period) is larger than the first period and the last period. Thus, deterioration of the battery 10 may be reduced or prevented when the first period is large. This may prevent the charging time from increasing when the last period is large, and may allow the battery 10 to be stably charged.

In one or more of the aforementioned embodiments, the battery management system 20 may be implemented in hardware, software, or both. In one embodiment, the methods, processes, and/or operations described herein may be performed by code or instructions to be executed by a computer, processor, controller, manager, or other signal processing device. The computer, processor, controller, manager, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

By way of summation and review, various techniques have been proposed to control the charging of a battery. However, these techniques cause rapid deterioration of the battery, necessitating its replacement. In accordance with one or more of the aforementioned embodiments, a charging operation is controlled to reduce or prevent battery deterioration and/or to reduce charging time.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A method of charging a battery, the method comprising:
   performing a first charging operation based on a first current in a first period including a first constant current period;
   performing a second charging operation based on a second current in a second period including a second constant current period; and
   performing a third charging operation based on a third current in a third period including a third constant current period, wherein the first, second, and third charging operations are performed by a battery manager, wherein the second period is between the first and third periods, wherein the second current is greater than the third current, and wherein the second constant current period is longer than the first and third constant current periods.

2. The method as claimed in claim 1, wherein each of the first, second, and third periods includes a constant current supplying period and a constant voltage supplying period.

3. The method as claimed in claim 2, wherein different currents are supplied in the constant current supplying periods of at least two of the first, second, or third periods.

4. The method as claimed in claim 3, wherein the second current supplied in the second period is less than the first current supplied in the first period.

5. The method as claimed in claim 2, wherein different voltages are supplied in the constant voltage supplying periods of at least two of the first, second, or third periods.

6. The method as claimed in claim 5, wherein the voltage supplied in the constant voltage supplying period of the second period is less than the voltage supplied in the constant voltage supplying period of the first period, and wherein the voltage supplied in the constant voltage supplying period of the third period is less than the voltage supplied in the constant voltage supplying period of the second period.

7. The method as claimed in claim 2, wherein the battery is completely charged at an end of the third period.

8. The method as claimed in claim 7, wherein the constant current supplying period in the second period is larger than the constant current supplying period in the first period and the constant current supplying period in the third period.

9. The method as claimed in claim 7, wherein the constant voltage supplying period in the first period is larger than the constant voltage supplying period in the second period and the constant voltage supplying period in the third period.

10. The method as claimed in claim 7, wherein the constant current supplying period of the first period is larger than the constant current supplying period of the third period, and wherein the constant voltage supplying period of the first period is larger than the constant voltage supplying period of the third period.

11. The method as claimed in claim 7, wherein the constant current supplying period of the second period is larger than the constant current supplying period of the third period, and wherein the constant voltage supplying period of the second period is larger than the constant voltage supplying period of the third period.

12. The method as claimed in claim 1, wherein the first, second, and third periods are determined based on a charging state of the battery.

13. A battery pack, comprising:
   a chargeable battery; and
   a battery manager to control a charging operation of the chargeable battery in first, second, and third periods, wherein each of the first, second, and third periods includes a constant current supplying period and a constant voltage supplying period, wherein the third period is less than the second period, and wherein the constant current supplying period in the first period and the constant current supplying period of the third period are smaller than the constant current supplying period in the second period.

14. The battery pack as claimed in claim 13, further comprising:
   at least one of a current detector to measure a charging current of the battery or a voltage detector to measure a charging voltage of the battery.

15. The battery pack as claimed in claim 13, wherein at least one of a charging current or a charging voltage of the battery is different in at least two of the first, second, or third periods.

16. The battery pack as claimed in claim 13, wherein the battery is completely charged at an end of the third period.

17. A battery pack, comprising:
   a rechargeable battery; and
   a battery manager to control charging of the rechargeable battery in at least first, second, and third periods, wherein each of the first, second, and third periods includes a constant current supplying period and a constant voltage supplying period, and wherein the battery manager is to control supply of different currents in the constant current supplying periods of at least two of the first, second, or third periods, the second period between the first and third periods, the constant current supplying period of the second period is longer than the constant current supplying period of each of the first and third periods, the current applied in the constant current period of the second period greater than the current applied in the constant current period of the third period and is to control supply of different voltages in the constant voltage supplying periods of at least two of the first, second, and third periods.

18. The battery pack as claimed in claim 17, wherein the current supplied in the second period is less than the current supplied in the first period.

19. The battery pack as claimed in claim 17, wherein the voltage supplied in the constant voltage supplying period of the second period is less than the voltage supplied in the constant voltage supplying period of the first period, and wherein the voltage supplied in the constant voltage supplying period of the third period is less than the voltage supplied in the constant voltage supplying period of the second period.

* * * * *